United States Patent [19]

Chipman

[11] 4,103,536

[45] Aug. 1, 1978

[54] METHOD FOR DETECTING LEAKS IN HEAT EXCHANGERS

[75] Inventor: Arthur H. Tigner Chipman, Long Beach, Calif.

[73] Assignee: Shell Oil Company, Houston, Tex.

[21] Appl. No.: 768,934

[22] Filed: Feb. 16, 1977

[51] Int. Cl.² ............................................. G01M 3/04
[52] U.S. Cl. ........................................ 73/40; 73/40.7
[58] Field of Search ....................... 73/40, 40.5 R, 40.7

[56] References Cited

U.S. PATENT DOCUMENTS

| 1,423,902 | 7/1922 | Bauer et al. ............................... 73/40 |
| 2,675,493 | 4/1954 | Grobel ............................... 73/40.7 X |

Primary Examiner—Richard C. Queisser
Assistant Examiner—Joseph W. Roskos

[57] ABSTRACT

In oil or chemical process equipment wherein process fluids under pressure are cooled by indirect heat exchange with cooling water which is subsequently recycled through a water cooling tower, leakage of process fluids into the cooling water is objectionable and potentially dangerous. A simple method for detecting such leaks and spotting the responsible heat exchange equipment consists of passing a sample stream of the cooling water, taken ahead of the cooling tower, through a testing vessel wherein the liquid flow is slowed sufficiently to permit entrained process fluids to separate while a constant water level is maintained in the testing vessel, and visually or instrumentally determining the presence and, if desired, the identity of contaminants separated in the testing vessel.

2 Claims, 2 Drawing Figures

METHOD FOR DETECTING LEAKS IN HEAT EXCHANGERS

BACKGROUND OF THE INVENTION

1. Field of the Invention

This invention relates to the detection of pollutants in cooling water employed for indirect cooling of process streams.

2. Description of the Prior Art

It is well known to cool hydrocarbon or chemical process streams by indirect exchange with cooling water in an essentially closed system wherein the cooling water is subsequently passed through a cooling tower and returned to the heat exchangers. In most cases the pressure of the process fluid in the heat exchangers is higher than that of the cooling water. Occasionally, small leaks develop which permit process fluid to escape into and pollute the cooling water. The presence of such pollutants in the cooling water is undesirable for many reasons. If the pollutant is relatively volatile, such as a light hydrocarbon or hydrogen sulfide, it will escape into the atmosphere from the cooling tower, causing objectionable air pollution and possibly presenting a serious fire and explosions hazard. Many contaminants also have the effect of depleting biocides, such as chlorine, in the cooling water. It is, of course, also desirable to avoid loss of valuable process fluids. Hence, it is desired to detect contamination of cooling water as soon as possible and to be able to identify the leaking heat exchanger.

The method employed to date has been simply to visually inspect the bottom pan of a cooling tower periodically, such as once a day or once a shift, to look for contaminants floating on the water. Conventionally, no special measures are applied to detect escape of gases into the cooling water stream, and such contamination has been known to lead to explosions or fires.

SUMMARY OF THE INVENTION

I have now devised a simple and effective method for continuously monitoring cooling water for the presence of immiscible process fluids resulting from leakage of process fluids into the cooling water. The method consists of continuously sampling the cooling water stream upstream from the cooling tower, passing the sample stream through a testing vessel in which the velocity of the liquid is slowed sufficiently to permit the separation of entrained immiscible liquids or gases while a constant level of water is maintained in the testing vessel, and either determining visually the presence of separated liquid or gases by observation of the testing vessel or providing appropriate instrumental means for detecting and, if desired, identifying the pollutants separated in the testing vessel.

BRIEF DESCRIPTION OF THE DRAWING

In the accompanying drawing

DESCRIPTION OF THE PREFERRED EMBODIMENTS

Figure 1:
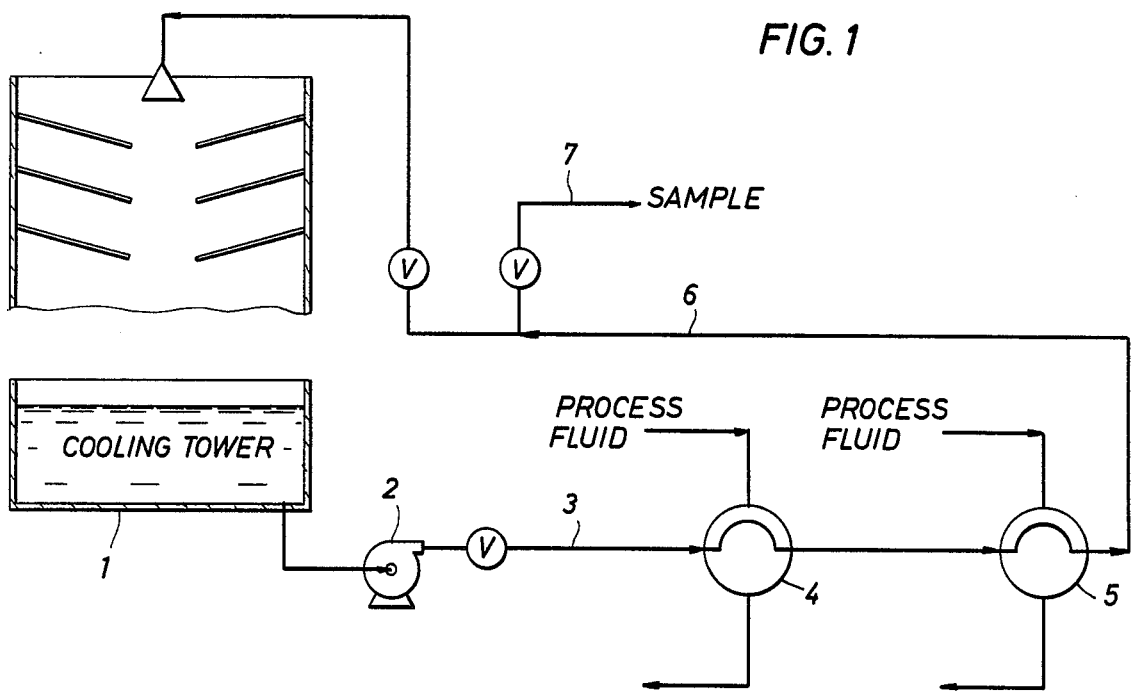
FIG. 1 is a schematic representation of a system consisting of process units and a cooling tower and FIG. 2 is a schematic representation of the testing vessel and associated equipment.

Indirect cooling of process fluids is widely practiced in the refining and chemical industries. Leaks of process fluids into the cooling water are undesirable for a number of reasons and in some cases potentially hazardous. Process streams in petroleum refining are primarily hydrocarbon liquids, vapors, and gases, and may include hydrogen or hydrogen sulfide. Leakage of such process streams into the cooling water can have a number of undesirable consequences. It is economically wasteful. It may cause fouling of downstream equipment, such as parts of the cooling tower. Gases or vapors may escape into the atmosphere from the cooling tower, causing atmospheric pollution and, at worst, explosion hazards.

It is desirable to provide a means for continuously monitoring for leaky heat exchange equipment. To my knowledge no such systems have been put into practice. I have now devised a simple and effective system for detecting leaks of immiscible process fluids into cooling water employed in indirect process heat exchange.

My invention will be described by reference to the drawing, which illustrates a typical system involving only lighter-than-water contaminants. Water from cooling tower 1 is pumped by circulation pump 2 by way of cooling water line 3 through one or more heat exchangers, here illustrated by heat exchangers 4 and 5. Used cooling water is returned to the cooling tower through return line 6. A sample of the used cooling water is continuously withdrawn from the top of the cooling water return line through sample line 7.

Figure 2:
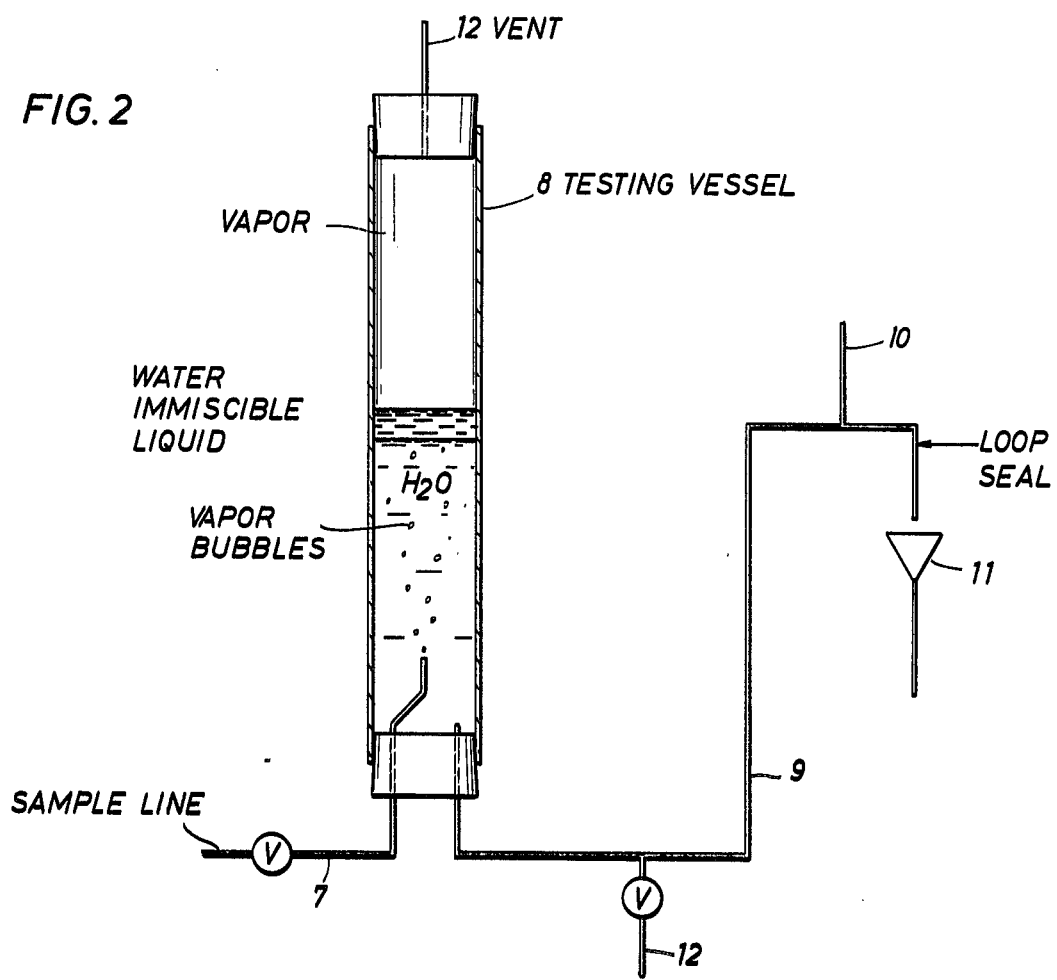

The sample system, in its simplest but highly useful form, is illustrated in FIG. 2 of the drawing. The sample stream is introduced through line 7 into testing vessel 8, which may be a simple glass cylinder, for example one and a half to two inches in diameter, having rubber stoppers at the top and bottom. Line 7 passes through the rubber stopper and terminates a small distance above the bottom of the vessel, say two inches. A water level is maintained about half way up the cylinder. Water is continuously withdrawn through line 9 from the bottom of the testing vessel. A loop seal is provided to maintain the water level in the testing vessel; siphoning is prevented by an anti-siphon vent 10 and by draining through an open outlet into a drain funnel 11. A vent 12 is provided in the top of the testing vessel.

In operation, if immiscible contaminant liquids or gases are entrained in the cooling water sample stream, observation of the testing vessel will show a layer of the water immiscible liquid floating above the water and, in the case of vapor contaminants, bubbles of vapor rising through the water.

This system is specifically devised for immiscible liquids which are lighter than water, such as most hydrocarbons which commonly occur in petroleum refining practice. Since the sampling point is at the top of the cooling water return line, contaminants which are denser than water may not be carried along in the sample stream. The system can be modified to detect denser-than-water contaminants by sampling from the bottom of the return water line and by providing space in the vessel below the drain line outlet to permit such denser fluids to accumulate. A second drain line would then be required in order to permit periodic emptying of the testing vessel after the source of contamination has been removed.

In operation of the system illustrated in FIG. 2, observation of a contaminant layer floating on the water will signal the need to determine the source of leakage. After the source of leakage has been removed, the testing vessel is emptied through valved drain outlet 12 and the clean testing vessel again placed into operation.

It will be readily seen that instrumentation of various degrees of sophistication can be provided to permit monitoring of the contaminants separated in the testing vessel. For instance, the type of liquid floating on the water layer may be tested either by appropriate sampling or by spectrographic means. Vapor rising into the vapor space may be tested by appropriate means, such as electronic gas detection equipment, e.g., an explosimeter, or by passage through a chromatograph such as a gas-liquid chromatograph, or, in the case of some chemicals, by simply passing the vapor through appropriate analytical solutions or test papers.

Since the greatest hazard associated with leakage into a cooling water system arises from potentially explosive hydrocarbon vapors or gases, it is preferred to connect the vapor space to a device for determining explosive mixtures which can be set to activate an appropriate alarm if explosive mixtures are detected.

Many such analytical and alarm devices are well known and commercially sold.

I claim as my invention:

1. The method of detecting leakage into cooling water of water-immiscible, liquid or gaseous process fluids which comprise at least one member of the group consisting of hydrocarbon liquids having a lower density than water and hydrocarbon vapors, from at least one piece of indirect heat exchange equipment wherein the process fluid is at a higher pressure than the cooling water, which comprises continuously withdrawing a sample stream of cooling water downstream from said heat exchange equipment from the upper portion of the conduit in which the cooling water is returned to the cooling means and passing the sample stream through a vertical transparent testing vessel which permits visual observation of its contents, wherein the liquid flow is slowed sufficiently to permit entrained process fluids to separate while a constant water level is maintained, and determining the presence and, if desired, the identity of said process fluids separated in said testing vessel.

2. The method of detecting leakage of water-immiscible, liquid or gaseous process fluids which comprise at least one member of the group consisting of hydrocarbon liquids having a lower density than water and hydrocarbon vapors into cooling water which has passed through at least two pieces of indirect heat exchange equipment wherein the process fluids are at a higher pressure than the cooling water, which comprises continuously withdrawing a sample stream of cooling water downstream from said heat exchange equipment, passing the sample stream through a testing vessel wherein the liquid flow is slowed sufficiently to permit entrained process fluids to separate while a constant water level is maintained, and analyzing the immiscible fluid separated in said testing vessel to determine its identity in order to locate the source of leakage.

* * * * *